US008563915B2

(12) United States Patent
Takenaka et al.

(10) Patent No.: US 8,563,915 B2
(45) Date of Patent: Oct. 22, 2013

(54) IMAGING APPARATUS, IMAGING SYSTEM, METHOD OF CONTROLLING THE APPARATUS AND THE SYSTEM, AND PROGRAM

(75) Inventors: Katsuro Takenaka, Honjo (JP); Tadao Endo, Honjo (JP); Toshio Kameshima, Kumagaya (JP); Tomoyuki Yagi, Honjo (JP); Keigo Yokoyama, Honjo (JP); Sho Sato, Honjo (JP)

(73) Assignee: Canon Kabushiki Kaisha, Tokyo (JP)

( * ) Notice: Subject to any disclaimer, the term of this patent is extended or adjusted under 35 U.S.C. 154(b) by 348 days.

(21) Appl. No.: 12/908,171

(22) Filed: Oct. 20, 2010

(65) Prior Publication Data

US 2011/0095169 A1      Apr. 28, 2011

(30) Foreign Application Priority Data

Oct. 26, 2009   (JP) .................................. 2009-245806

(51) Int. Cl.
| | |
|---|---|
| H01L 27/14 | (2006.01) |
| H04N 5/335 | (2011.01) |
| G01T 1/20 | (2006.01) |
| G01T 1/24 | (2006.01) |
| G01J 1/44 | (2006.01) |

(52) U.S. Cl.
USPC .................. 250/208.1; 250/370.09; 378/98.8; 348/241; 348/308

(58) Field of Classification Search
USPC ............... 250/208.1, 370.01, 370.08, 370.09; 378/98.8; 348/241, 302, 303, 304, 308
See application file for complete search history.

(56) References Cited

U.S. PATENT DOCUMENTS

| | | | | |
|---|---|---|---|---|
| 6,690,493 | B1* | 2/2004 | Kobayashi et al. | 358/482 |
| 8,179,469 | B2* | 5/2012 | Endo et al. | 348/308 |
| 2001/0033337 | A1 | 10/2001 | Sakuragi | |
| 2001/0052941 | A1* | 12/2001 | Matsunaga et al. | 348/308 |
| 2007/0115379 | A1* | 5/2007 | Endo et al. | 348/308 |
| 2009/0101798 | A1* | 4/2009 | Yadid-Pecht et al. | 250/208.1 |
| 2009/0251571 | A1* | 10/2009 | Takayama | 348/241 |
| 2009/0272909 | A1* | 11/2009 | Takenaka et al. | 250/370.09 |
| 2010/0046711 | A1 | 2/2010 | Kameshima et al. | |
| 2012/0268632 | A1* | 10/2012 | Kamon et al. | 348/294 |

FOREIGN PATENT DOCUMENTS

| | | |
|---|---|---|
| JP | 2004147296 A | 5/2004 |
| JP | 2005303720 A | 10/2005 |
| JP | 2007104219 A | 4/2007 |
| WO | 2004/095833 A1 | 11/2004 |
| WO | 2007/043487 A1 | 4/2007 |
| WO | 2009/031693 A1 | 3/2009 |

\* cited by examiner

*Primary Examiner* — John Lee
(74) *Attorney, Agent, or Firm* — Canon U.S.A., Inc. IP Division

(57) ABSTRACT

An imaging apparatus includes a conversion unit including a plurality of pixels arranged in a matrix, each pixel including a conversion element, an output switch element, and an initialization switch element; an output drive circuit controls an output operation; an initialization drive circuit controls an initialization operation; and a readout circuit performs a signal sample-and-hold operation and a reset operation. A control unit performs termination of the output operation of a certain row and start of the output operation of another row after the termination of the reset operation, the start of the signal sample-and-hold operation after the termination of the output operation of the certain row and the start of the output operation of the other row, the start of the reset operation and the initialization operation after the termination of the signal sample-and-hold operation, and the termination of the reset operation after the termination of the initialization operation.

8 Claims, 8 Drawing Sheets

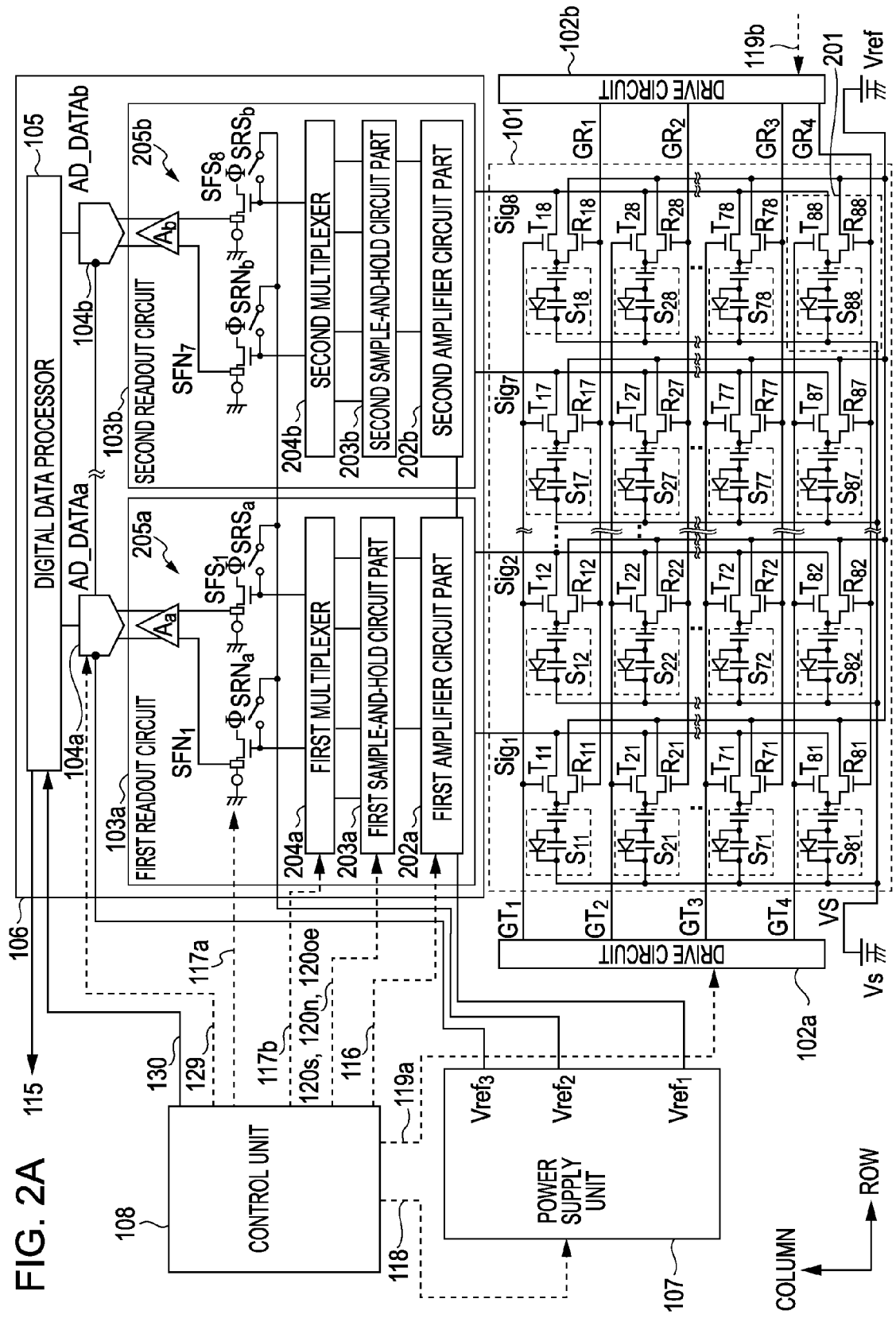

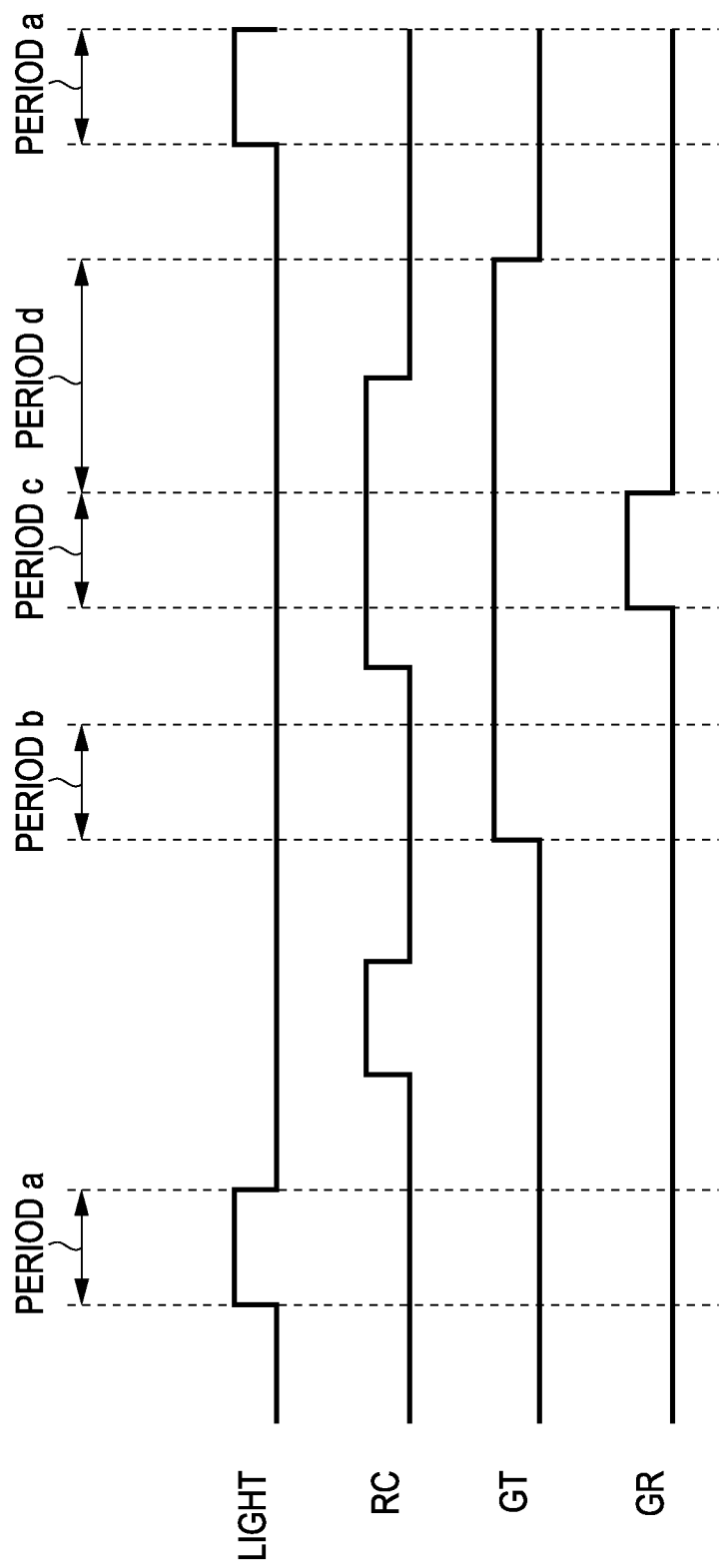

IMAGING APPARATUS, IMAGING SYSTEM, METHOD OF CONTROLLING THE APPARATUS AND THE SYSTEM, AND PROGRAM

BACKGROUND OF THE INVENTION

1. Field of the Invention

The present invention relates to an imaging apparatus, an imaging system, a method of controlling the apparatus and the system, and a program. More specifically, the present invention relates to a radiation imaging apparatus and a radiation imaging system that can be used in capturing of still and moving images, such as photography, and recording of movies, such as fluoroscopy, in medical diagnosis, a method of controlling the apparatus and the system, and a program.

2. Description of the Related Art

In recent years, radiation imaging apparatuses using flat panel detectors (hereinafter abbreviated as FPDs) made of semiconductor materials have come into practical use as image capturing apparatuses used in medical image diagnosis and non-destructive tests using X rays. Such radiation imaging apparatuses are used as digital imaging apparatuses for capturing of still image, such as photography, and recording of movies, such as fluoroscopy, for example, in the medical image diagnosis.

Techniques to initialize conversion elements included in the pixels in the FPDs by using switch elements different from switch elements for outputting signals are discussed in such a radiation imaging apparatus, as disclosed in U.S. Patent Application Publication No. 2010/0046711.

In the technique disclosed in U.S. Patent Application Publication No. 2010/0046711, a voltage variation component caused by the rising of a drive signal requires a time depending on the resistance of a drive line and the capacitance of a crossing section before the voltage variation component converges into a certain voltage. In addition, when a transistor having a control terminal (gate) and two main terminals (source and drain) is used as an output switch element, the voltage variation component also requires a time depending on the resistance of the drive line and the capacitance between the gate and the source (Cgs) before the voltage variation component converges into the certain voltage. Accordingly, it is necessary to wait a certain time for the voltage variation component that converges into the certain voltage after an output operation is terminated before a sample-and-hold operation is performed. Since the certain time occurs in units of rows, it is necessary to wait the certain time 1,000 times in order to acquire an image signal corresponding to one image from, for example, a conversion unit of 1,000 rows by 1,000 columns. However, in a case in which it is necessary to shorten the time before the image signal is output, such as in the recording of movies (fluoroscopy), a frame rate that is required may not be achieved if the sample-and-hold operation is not performed within the time when the voltage variation component converges. Since the sample-and-hold operation is performed within the time when the voltage variation component converges in the above case, an electrical signal that is output and held is affected by the voltage variation to increase the amount of a noise component, thereby decreasing a signal-to-noise ratio (S/N ratio) of the image signal captured by the imaging apparatus. Consequently, it is difficult to reduce the time (frame time) necessary to read out the image signal, for example, during which the recording of movies at a frame rate of 30 frames per second is achieved, without decreasing the S/N ratio.

SUMMARY OF THE INVENTION

The present invention provides an imaging apparatus capable of acquiring an image signal having excellent S/N ratio while achieving a desired frame time.

According to an embodiment of the present invention, an imaging apparatus includes a conversion unit including a plurality of pixels arranged in a matrix, each pixel including a conversion element that converts radiation or light into an electric charge, an output switch element that performs an output operation to be in a conductive state to output an electrical signal based on the electric charge of the conversion element, and an initialization switch element that performs an initialization operation to be in the conductive state to initialize the conversion element and that is provided separately from the output switch element; an output drive circuit controlling the output operation in units of rows; an initialization drive circuit controlling the initialization operation in units of rows; a readout circuit that includes a transmission path through which the output electrical signal is transmitted and that performs a signal sample-and-hold operation to temporarily hold the electrical signal read out through the transmission path and a reset operation to reset the voltage of the transmission path; and a control unit controlling the output drive circuit, the initialization drive circuit, and the readout circuit so as to perform termination of the output operation of a certain row and start of the output operation of another row subsequent to the certain row after the termination of the reset operation, the start of the signal sample-and-hold operation after the termination of the output operation of the certain row and the start of the output operation of the other row, the start of the reset operation and the initialization operation after the termination of the signal sample-and-hold operation, and the termination of the reset operation after the termination of the initialization operation.

According to another embodiment of the present invention, a method of controlling an imaging apparatus including a conversion unit that includes a plurality of pixels arranged in a matrix, each pixel including a conversion element that converts radiation or light into an electric charge, an output switch element that performs an output operation to be in a conductive state to output an electrical signal based on the electric charge of the conversion element, and an initialization switch element that performs an initialization operation to be in the conductive state to initialize the conversion element and that is provided separately from the output switch element, and a readout circuit that includes a transmission path through which the output electrical signal is transmitted and that performs a signal sample-and-hold operation to temporarily hold the electrical signal read out through the transmission path and a reset operation to reset the voltage of the transmission path includes the steps of terminating the output operation of a certain row and starting the output operation of another row subsequent to the certain row after the termination of the reset operation; starting the signal sample-and-hold operation after the termination of the output operation of the certain row and the start of the output operation of the other row; starting the reset operation and the initialization operation after the termination of the signal sample-and-hold operation; and terminating the reset operation after the termination of the initialization operation.

According to another embodiment of the present invention, a computer-readable recording medium includes a program causing a computer to control an imaging apparatus including a conversion unit that includes a plurality of pixels arranged in a matrix, each pixel including a conversion element that converts radiation or light into an electric charge, an output switch element that performs an output operation to be in a conductive state to output an electrical signal based on the electric charge of the conversion element, and an initialization switch element that performs an initialization operation to be in the conductive state to initialize the conversion element and that is provided separately from the output switch element, and a readout circuit that includes a transmission path through which the output electrical signal is transmitted and that performs a signal sample-and-hold operation to temporarily hold the electrical signal read out through the transmission path and a reset operation to reset the voltage of the transmission path. The program causes the computer to perform the steps of terminating the output operation of a certain row and starting the output operation of another row subsequent to the certain row after the termination of the reset operation; starting the signal sample-and-hold operation after the termination of the output operation of the certain row and the start of the output operation of the other row; starting the reset operation and the initialization operation after the termination of the signal sample-and-hold operation; and terminating the reset operation after the termination of the initialization operation.

According to another embodiment of the present invention, an imaging apparatus includes a conversion unit including a plurality of pixels arranged in a matrix, each pixel including a conversion element that includes two electrodes and that converts radiation or light into an electric charge, an output switch element that is electrically connected to one electrode of the conversion element, and an initialization switch element that is electrically connected to another electrode of the conversion element and the output switch element; an output drive circuit electrically connected to control terminals of multiple output switch elements in each row of the matrix; an initialization drive circuit electrically connected to control terminals of multiple initialization switch elements in each row of the matrix; a readout circuit including a transmission path through which the output electrical signal is transmitted, a signal sampling switch electrically connected to the transmission path, and a reset switch resetting the voltage of the transmission path; and a control unit controlling the output drive circuit, the initialization drive circuit, and the readout circuit so as to perform termination of conduction of the output switch elements of a certain row and start of the conduction of the output switch elements of another row subsequent to the certain row after the termination of the conduction of the reset switch, the start of the conduction of the signal sampling switch after the termination of the conduction of the output switch elements of the certain row and the start of the conduction of the output switch elements of the other row, the start of the conduction of the reset switch and the conduction of the initialization switch elements after the termination of the conduction of the signal sampling switch, and the termination of the conduction of the reset switch after the termination of the conduction of the initialization switch elements.

According to the present invention, it is possible to provide an imaging apparatus capable of acquiring an image signal having excellent S/N ratio while achieving a desired frame time.

Further features of the present invention will become apparent from the following description of exemplary embodiments with reference to the attached drawings.

BRIEF DESCRIPTION OF THE DRAWINGS

FIGS. 2A and 2B are exemplary conceptual equivalent circuit diagrams of the imaging apparatus according to the embodiment of the present invention.

FIGS. 3A to 3C illustrate examples of the structure and the operation of one pixel according to an embodiment of the present invention.

DESCRIPTION OF THE EMBODIMENTS

Embodiments of the present invention will herein be described in detail with reference to the attached drawings.

Figure 1:
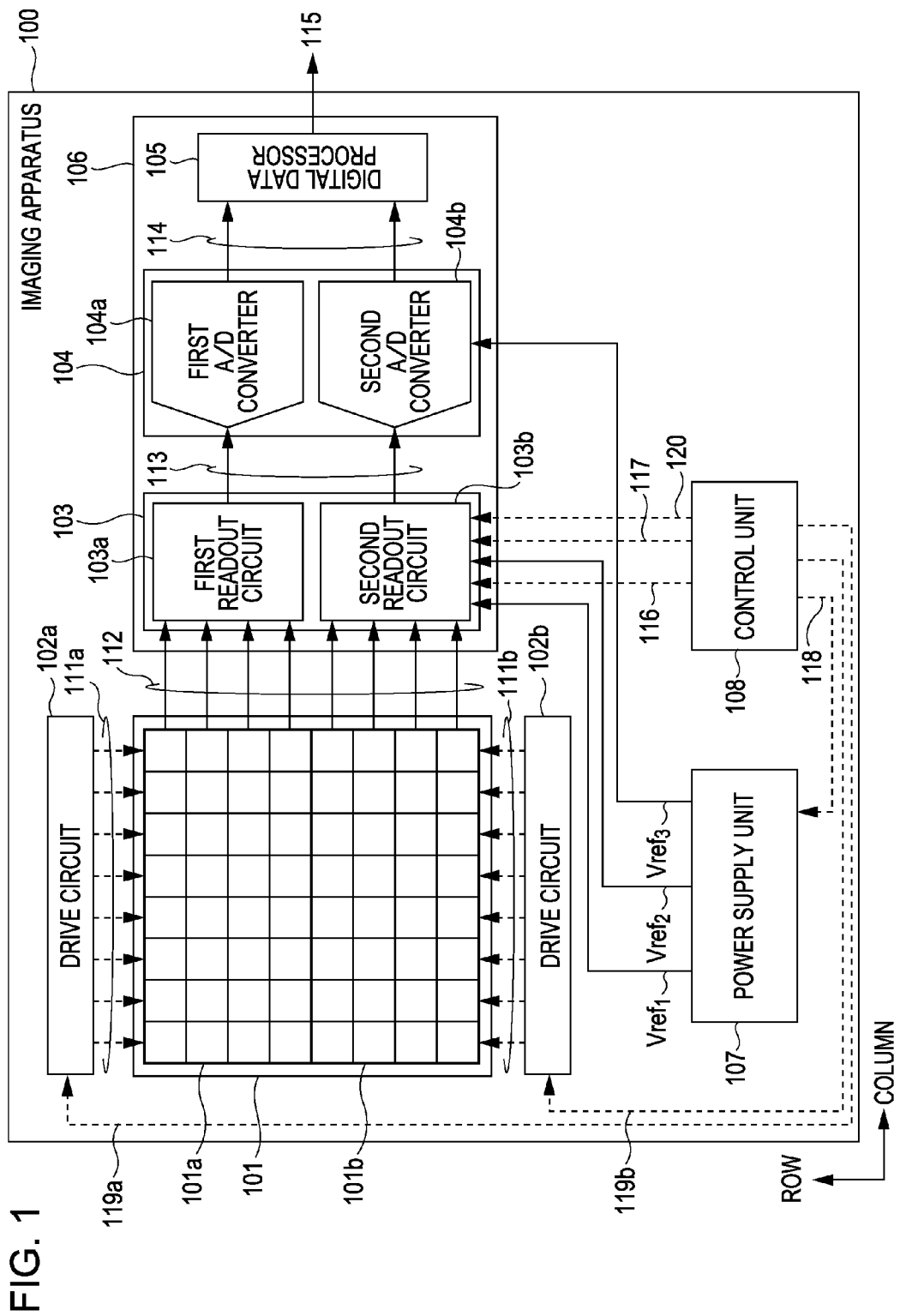
FIG. 1 is an exemplary conceptual block diagram of an imaging apparatus according to an embodiment of the present invention.

FIG. 1 an exemplary conceptual block diagram of an imaging apparatus 100 according to an embodiment of the present invention. The imaging apparatus 100 includes a conversion unit 101 that includes multiple pixels each converting radiation or light into an analog electrical signal and drive circuits 102a and 102b that drive the conversion unit 101. The pixels are arranged in a matrix. In the present embodiment of the present invention, the conversion unit 101 includes pixels of eight rows by eight columns for convenience and the pixels are divided into a first pixel group 101a and a second pixel group 101b each including a set of pixels of four columns. A pixel signal, which is the analog electrical signal output from each pixel in the first pixel group 101a, is read out by the corresponding first readout circuit 103a. A pixel signal 113, which is the analog electrical signal output from the first readout circuit 103a, is converted into digital data 114 by the corresponding first analog-to-digital (A/D) converter 104a. Similarly, the analog electrical signal output from each pixel in the second pixel group 101b is read out by the corresponding second readout circuit 103b and is converted into digital data by the corresponding second A/D converter 104b. The digital data from each of the first A/D converter 104a and the second A/D converter 104b is subjected to signal processing described below, digital multiplexing processing, offset correction, etc. in a digital data processor 105 and the digital data resulting from the processing is output as a digital image signal 115. A signal processing unit 106 includes a readout circuit portion 103 including the first readout circuit 103a and the second readout circuit 103b, an A/D conversion portion 104 including the first A/D converter 104a and the second A/D converter 104b, and the digital data processor 105. The imaging apparatus 100 also includes a power supply unit 107 applying bias voltages to components in the signal processing unit 106. The power supply unit 107 applies reference voltages $Vref_1$ and $Vref_2$ to the readout circuit portion 103 and applies a reference voltage $Vref_2$ to the A/D conversion portion 104. The imaging apparatus 100 further includes a control unit 108 controlling at least one of the signal processing unit 106 and the power supply unit 107. The control unit 108 supplies a control signal 118 to the power supply unit 107. The control unit 108 supplies control signals 116, 117, and 120 to the readout circuit portion 103. The control unit 108 supplies drive control signals 119a and 119b to the drive circuit 102a and the drive circuit 102b, respectively. The drive circuit 102a and the drive circuit 102b supply control signals 111a and 111b to the conversion unit 101 on the basis of the drive control signal 119a and the drive control signal 119b, respectively.

FIG. 2A is an exemplary conceptual diagram of the imaging apparatus, including a conceptual equivalent circuit diagram of the imaging apparatus according to the embodiment of the present invention. The same reference numerals are used in FIG. 2A to identify the same components described above with reference to FIG. 1. A detailed description of components described in reference to FIG. 1 is omitted herein to avoid unnecessary duplication. The conversion unit 101 includes multiple pixels 201 arranged in a matrix. The pixels 201 of eight by eight, which forms a matrix of eight rows by eight columns, are arranged in FIG. 2A for convenience. Each of the pixels 201 includes a conversion element S that converts radiation or light into an electric charge, an output switch element T that outputs an electrical signal corresponding to the electric charge, and an initialization switch element R that initializes the electric charge accumulated in the conversion element S. A Metal Insulator Semiconductor (MIS) or PIN photoelectric conversion element that is arranged on an insulating substrate, such as a glass substrate, and that is mainly made of an amorphous silicon material can be used as the conversion element S converting light into an electric charge. An indirect conversion element provided with a wavelength converter at the incident side of the radiation of the above photoelectric conversion element or a direct conversion element directly converting radiation into an electric charge can be used as the conversion element S converting radiation into an electric charge. The wavelength converter converts radiation into light within a waveband that can be detected by the photoelectric conversion element. A transistor including a control terminal and two main terminals can be used as the output switch element T and the initialization switch element R. A thin film transistor (TFT) can be used in the case of the pixels each including the photoelectric conversion element on the insulating substrate. One electrode (first electrode) of the conversion element S is electrically connected to one of the two main terminals of the output switch element T and to one of the two main terminals of the initialization switch element R. The other electrode (second electrode) of the conversion element S is electrically connected to a bias power supply Vs via a common sensor bias line VS. The other terminal of the two main terminals of the initialization switch element R is electrically connected to an initialization power supply Vref via a common line. The initialization switch element R performs an initialization operation to make the conversion element S close to an initialization state and is not needed to completely initialize the electric charge of the conversion element S. The initialization power supply Vref supplies a voltage for setting the conversion element S to a state in which the initialization operation can be performed to the first electrode of the conversion element S.

The control terminals of the output switch elements T of multiple pixels in the row direction, for example, the output switch elements $T_{11}$ to $T_{18}$ are commonly electrically connected to a drive line $GT_1$. A drive signal for controlling the conductive state of the output switch elements T is supplied from the output drive circuit 102a through the drive line for every row. Similarly, the control terminals of the initialization switch elements R of multiple pixels in the row direction, for example, the initialization switch elements $R_{11}$ to $R_{18}$ are commonly electrically connected to a drive line $GR_1$. A drive signal for controlling the conductive state of the initialization switch elements R is supplied from the initialization drive circuit 102b through the drive line for every row.

The other terminal of the two main terminals of each of the output switch elements T of multiple pixels in the column direction, for example, the output switch elements $T_{11}$ to $T_{81}$ are electrically connected to a signal line $Sig_1$ in the first column. While the output switch elements $T_{11}$ to $T_{18}$ are in the conductive state, an electrical signal corresponding to the electric charge of the conversion element S is supplied to the readout circuit portion 103 through the signal line. The electrical signals output from the multiple pixels in the conversion unit 101 are supplied in parallel to the readout circuit portion 103 through the multiple signal lines $Sig_1$ to $Sig_8$ in the column direction. According to the present embodiment, the conversion unit 101 is divided into the first pixel group 101a and the second pixel group 101b each having a set of pixels in four columns. The analog electrical signals output from the first pixel group 101a are read out in parallel by the corresponding first readout circuit 103a in the readout circuit portion 103, and the analog electrical signals output from the second pixel group 101b are read out in parallel by the corresponding second readout circuit 103b in the readout circuit portion 103.

The first readout circuit 103a includes a first amplifier circuit part 202a that amplifies the electrical signals output in parallel from the first pixel group 101a and a first sample-and-hold circuit part 203a that temporarily holds the electrical signals from the first amplifier circuit part 202a. The second readout circuit 103b similarly includes a second amplifier circuit part 202b and a second sample-and-hold circuit part 203b. In addition, the first readout circuit 103a includes a first multiplexer 204a that sequentially outputs the electrical signals read out in parallel from the first sample-and-hold circuit part 203a as a serial image signal, and the second readout circuit 103b includes a second multiplexer 204b that sequentially outputs the electrical signals read out in parallel from the second sample-and-hold circuit part 203b as a serial image signal. Furthermore, the first readout circuit 103a and the second readout circuit 103b include a first differential amplifier 205a and a second differential amplifier 205b, respectively, which are output buffers that perform impedance conversion to the image signals to output the image signals subjected to the impedance conversion. The electrical signals from the pixels are supplied to the first differential amplifier 205a or the second differential amplifier 205b through a signal buffer SFS. Noise components are supplied to the first differential amplifier 205a or the second differential amplifier 205b through a noise buffer SFN. The electrical signals and the noise components from the pixels, which are supplied to the first differential amplifier 205a, are subjected to subtraction and the electrical signals and the noise components subjected to the subtraction are supplied to the first A/D converter 104a. Similarly, the electrical signals and the noise components from the pixels, which are supplied to the second differential amplifier 205b, are subjected to the subtraction and the electrical signals and the noise components subjected to the subtraction are supplied to the second A/D converter 104b. The reference voltage $Vref_3$ is supplied from the power supply unit 107 to the first A/D converter 104a and the second A/D converter 104b. The reference voltage $Vref_2$ is supplied from the power supply unit 107 to the gate of the signal buffer SFS of each of the first readout circuit 103a and the second readout circuit 103b through a reset switch SRS at certain timing. The reference voltage $Vref_2$ is supplied from the power supply unit 107 to the gate of the noise buffer SFN of each of the first readout circuit 103a and the second readout circuit 103b through a reset switch SRN at certain timing. In other words, the reset switch SR resets the input into the differential amplifier at the certain timing in response to the reference voltage $Vref_2$ supplied to the gate of the buffer SF at the certain timing.

The control unit 108 supplies the control signal 116 to the first amplifier circuit part 202a and the second amplifier circuit part 202b. The control unit 108 supplies a control signal 117a to the reset switches SRS and SRN and supplies a control signal 117b to the first multiplexer 204a and the second multiplexer 204b. The control unit 108 supplies control signals 120s, 120n, and 120oe to the first sample-and-hold circuit part 203a and the second sample-and-hold circuit part 203b. The control unit 108 supplies a control signal 129 to the first A/D converter 104a and the second A/D converter 104b and supplies a control signal 130 to the digital data processor 105.

Figure 2B:
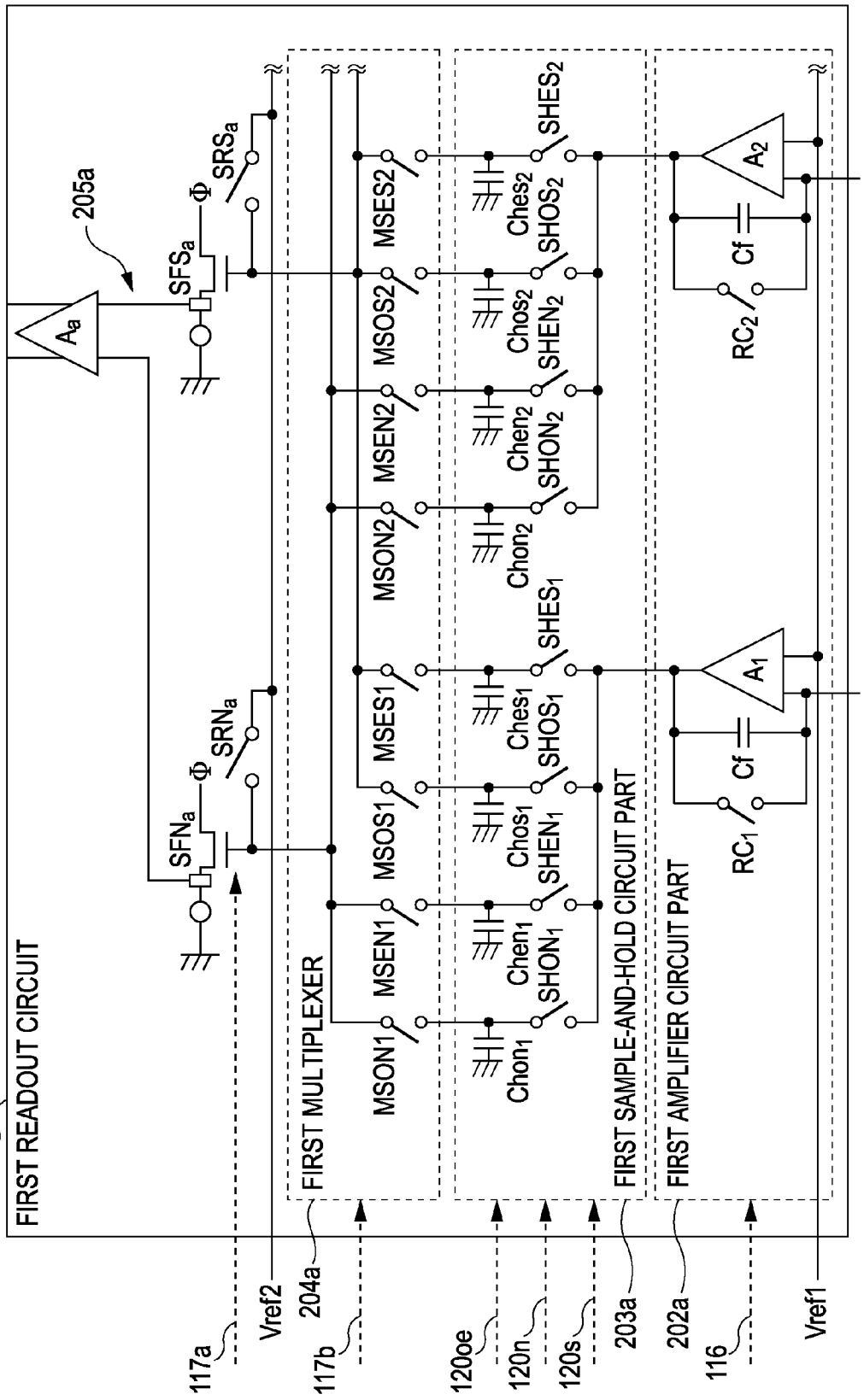

FIG. 2B is an exemplary equivalent circuit diagram describing the first readout circuit 103a in detail. The first amplifier circuit part 202a includes an amplifier circuit including an operational amplifier A that amplifies the electrical signals (pixel signals) read out from the pixels and outputs the amplified electrical signals (pixel signals), an integration capacitor Cf, and a reset switch RC that resets the integration capacitor Cf for every signal line. The electrical signal that is output is supplied to an inverting input terminal of the operational amplifier A and the electrical signal that is amplified is output from an output terminal thereof. The reference voltage $Vref_1$ is supplied from the power supply unit 107 to a non-inverting input terminal of the operational amplifier A. The integration capacitor Cf is arranged between the inverting input terminal and the output terminal of the operational amplifier A, and the reset switch RC is connected in parallel with the integration capacitor Cf. The first sample-and-hold circuit part 203a includes an odd-row-signal sample-and-hold circuit, an even-row-signal sample-and-hold circuit, an odd-row-noise sample-and-hold circuit, and an even-row-noise sample-and-hold circuit for every amplifier circuit. The odd-row-signal sample-and-hold circuit includes a sampling switch SHOS that samples the electrical signals from the odd-row pixels and a sampling capacitor Chos that holds the pixel signals of the odd rows. The even-row-signal sample-and-hold circuit includes a sampling switch SHES that samples the electrical signals from the even-row pixels and a sampling capacitor Ches that holds the pixel signals of the even rows. The odd-row-noise sample-and-hold circuit includes a sampling switch SHON that samples the noise components on a transmission path, such as the operational amplifier, before sampling the pixel signals of the odd rows and a sampling capacitor Chon that holds the noise signals. The even-row-noise sample-and-hold circuit includes a sampling switch SHEN that samples the noise components on the transmission path, such as the operational amplifier, before sampling the pixel signals of the even rows and a sampling capacitor Chen that holds the noise signals. The first multiplexer 204a includes a switch MSOS corresponding to the odd-row-signal sample-and-hold circuit, a switch MSES corresponding to even-row-signal sample-and-hold circuit, a switch MSON corresponding to the odd-row-noise sample-and-hold circuit, and a switch MSEN corresponding to the even-row-noise sample-and-hold circuit for every amplifier circuit. Sequential selection of the switches causes an operation to convert the parallel pixel signals and the parallel signals of the noise components into serial signals to be performed. The serial signals resulting from the conversion are supplied to the first A/D converter 104a through the first differential amplifier 205a and are sequentially converted into digital data in the first A/D converter 104a.

Figure 3A:
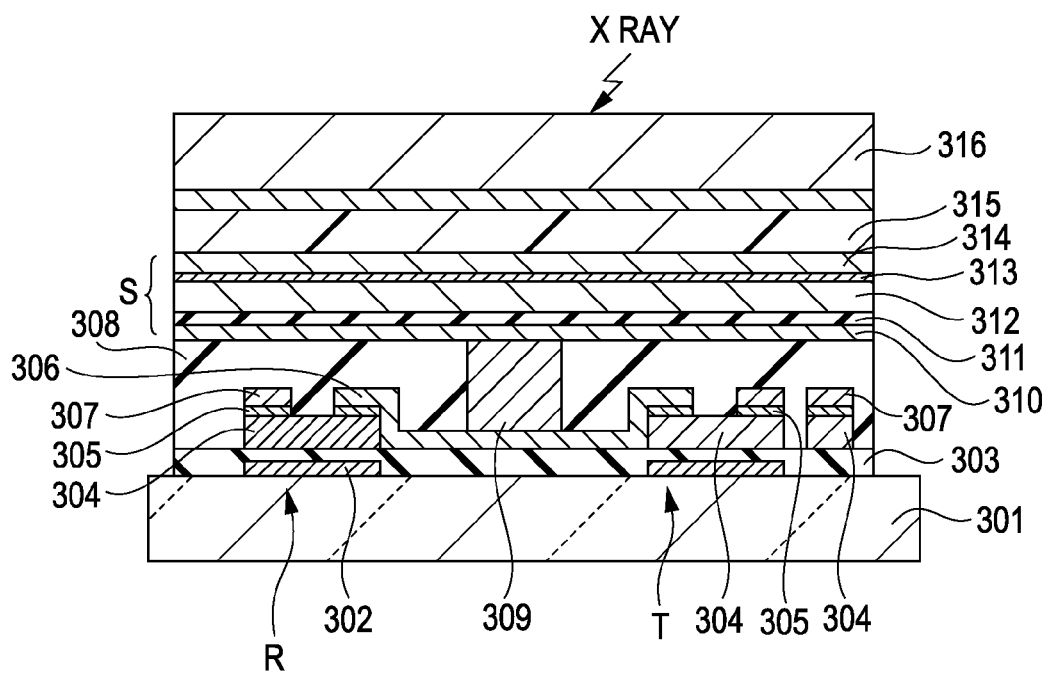

The structure and the operation of one pixel including the conversion element S, the output switch element T, and the initialization switch element R in the conversion unit 101 will now be described. In the present embodiment, the MIS photoelectric conversion element is used as the conversion element S and the initialization operation can be performed to enable a conversion operation. FIG. 3A is an exemplary cross-sectional view of one pixel. The output switch element T and the initialization switch element R each have a TFT structure in which a gate electrode layer (control terminal) 302, an insulating layer 303, a semiconductor layer 304, an impurity semiconductor layer 305, a drain electrode layer 306, and a source electrode layer 307 are laminated on an insulating substrate 301 made of glass or the like. The output switch element T and the initialization switch element R are each covered with an interlayer insulating layer 308 made of organic resin. The conversion element S is arranged over the output switch element T and the initialization switch element R with the interlayer insulating layer 308 sandwiched therebetween. The conversion element S has a structure in which a first electrode layer 310, an insulating layer 311, an intrinsic semiconductor layer 312, an impurity semiconductor layer 313, and a second electrode layer 314 are laminated. The insulating layers 303 and 311 may be formed of, for example, an amorphous silicon nitride film. The semiconductor layer 304 and the intrinsic semiconductor layer 312 may be formed of, for example, an amorphous silicon layer. The impurity semiconductor layers 305 and 313 may be formed of, for example, an amorphous silicon n layer. The first electrode layer 310 of the conversion element S, the drain electrode layer 306 of the output switch element T, and the drain electrode layer 306 of the initialization switch element R are connected via, for example, a conductive member 309. The conversion element S, the output switch element T, and the initialization switch element R are entirely covered with a protective layer 315, for example, formed of an amorphous silicon nitride film or made of organic resin. A wavelength converter 316 made of cesium iodide (CsI) is provided over the protective layer 315.

The operation of one pixel shown in FIG. 3A will now be described with reference to a schematic equivalent circuit diagram of one pixel in FIG. 3B and a timing chart of each pixel in FIG. 3C.

Figure 3B:
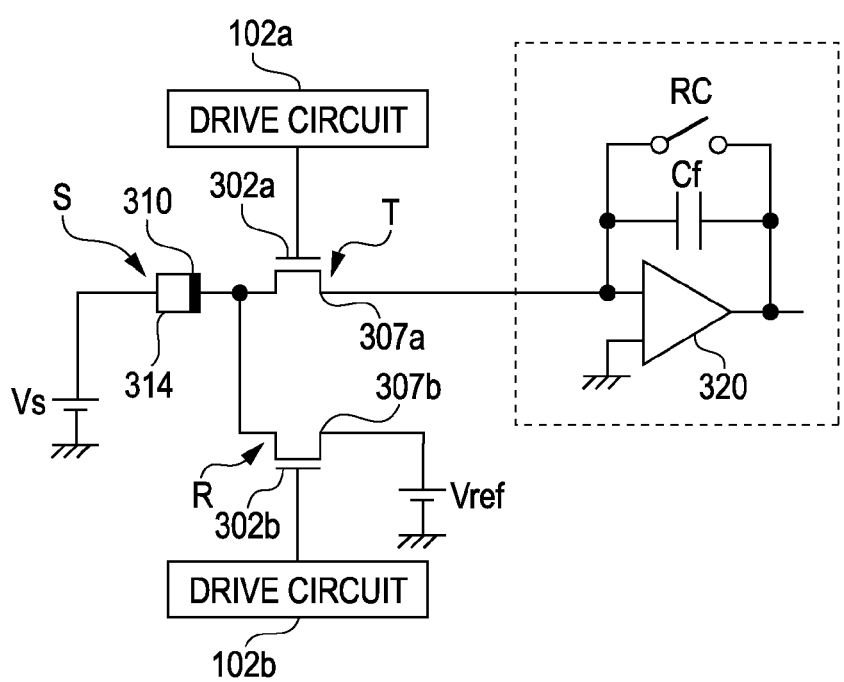

Referring to FIG. 3B, the second electrode layer 314 of the conversion element S is connected to the bias power supply Vs. The bias power supply Vs supplies a voltage to the second electrode layer 314 of the conversion element S to set the conversion element S in a state in which the conversion operation can be performed. The initialization power supply Vref is connected to a source 307b of the initialization switch element R. The initialization power supply Vref supplies a voltage to the first electrode layer 310 of the conversion element S to remove the carriers of either of electrons or holes accumulated in the conversion element S from the intrinsic semiconductor layer 312 of the conversion element S. A source 307a of the output switch element T is connected to the input side of an amplifier circuit 320 having a reset function. The amplifier circuit 320 corresponds to the amplifier circuit described above with reference to FIG. 2B. A gate 302a of the output switch element T is connected to the output drive circuit 102a controlling the output switch element T. A gate 302b of the initialization switch element R is connected to the initialization drive circuit 102b controlling the initialization switch element R.

One pixel operates at the timing shown in FIG. 3C. The conversion element S of one pixel in the present embodiment is characterized by performing the two operations: the conversion operation and the initialization operation. First, the conversion operation will now be described. As shown in a period a in FIG. 3C, the voltage of the second electrode layer 314 of the conversion element S is set to "Vs." The voltage of the first electrode layer 310 is set to a reference voltage of the amplifier circuit 320. Here, "Vs" is a positive voltage higher than the reference voltage of the amplifier circuit 320. The output switch element T and the initialization switch element R are in a non-conductive state. Upon incidence of light or an X ray into the conversion element S in this state, the electric charge occurring at the intrinsic semiconductor layer 312 is led to each electrode by the electric field. Specifically, the electrons are led to the side of the second electrode layer 314 and the holes are led to the side of the first electrode layer 310 to be accumulated on the interface between the intrinsic semiconductor layer 312 and the insulating layer 311. The voltage of the first electrode layer 310 increases due to the holes accumulated on the boundary surface of the insulating layer 311. The increasing voltage is supplied to the amplifier circuit 320 by setting the output switch element T to the conductive state, as shown in a period b in FIG. 3C. In contrast, upon incidence of a larger amount of light or X ray into the conversion element S in the conversion operation, the electric field applied to the intrinsic semiconductor layer 312 decreases due to the accumulated holes. As a result, the electric charge occurring at the intrinsic semiconductor layer 312 is recombined without being led to each electrode. In other words, the conversion operation is disabled. Performing the initialization operation described below in this state causes the electric field to be applied to the intrinsic semiconductor layer 312 again to enable the conversion operation.

Next, the initialization operation will now be described. In a period c in FIG. 3C, the output switch element T and the initialization switch element R are in the conductive state and the reset switch RC of the amplifier circuit 320 is in the conductive state to reset the transmission path. Accordingly, when the output switch element T has the same on-resistance as that of the initialization switch element R, the side of the first electrode layer 310 of the conversion element S is set to a voltage that is between "Vref" and the reference voltage of the amplifier circuit. Here, "Vref" is a positive voltage that is higher than the reference voltage of the amplifier circuit 320 and lower than "Vs." A positive voltage is applied to the first electrode layer 310 in this initialization operation with respect to the first electrode layer 310 in the conversion operation. Accordingly, at least part of the holes accumulated on the interface between the intrinsic semiconductor layer 312 and the insulating layer 311 in the conversion operation is led to the side of the second electrode layer 314 and disappears due to the electrons input from the second electrode layer 314. Then, as shown in a period d in FIG. 3C, setting the initialization switch element R to the non-conductive state while the conductive state of the output switch element T and the reset switch RC is kept and returning the voltage of the first electrode layer 310 to the reference voltage of the amplifier circuit allow the conversion operation to be performed. The conversion element S can repeat the conversion operation and the initialization operation shown in the periods a to d in FIG. 3C to continuously perform the operation.

Figure 4:
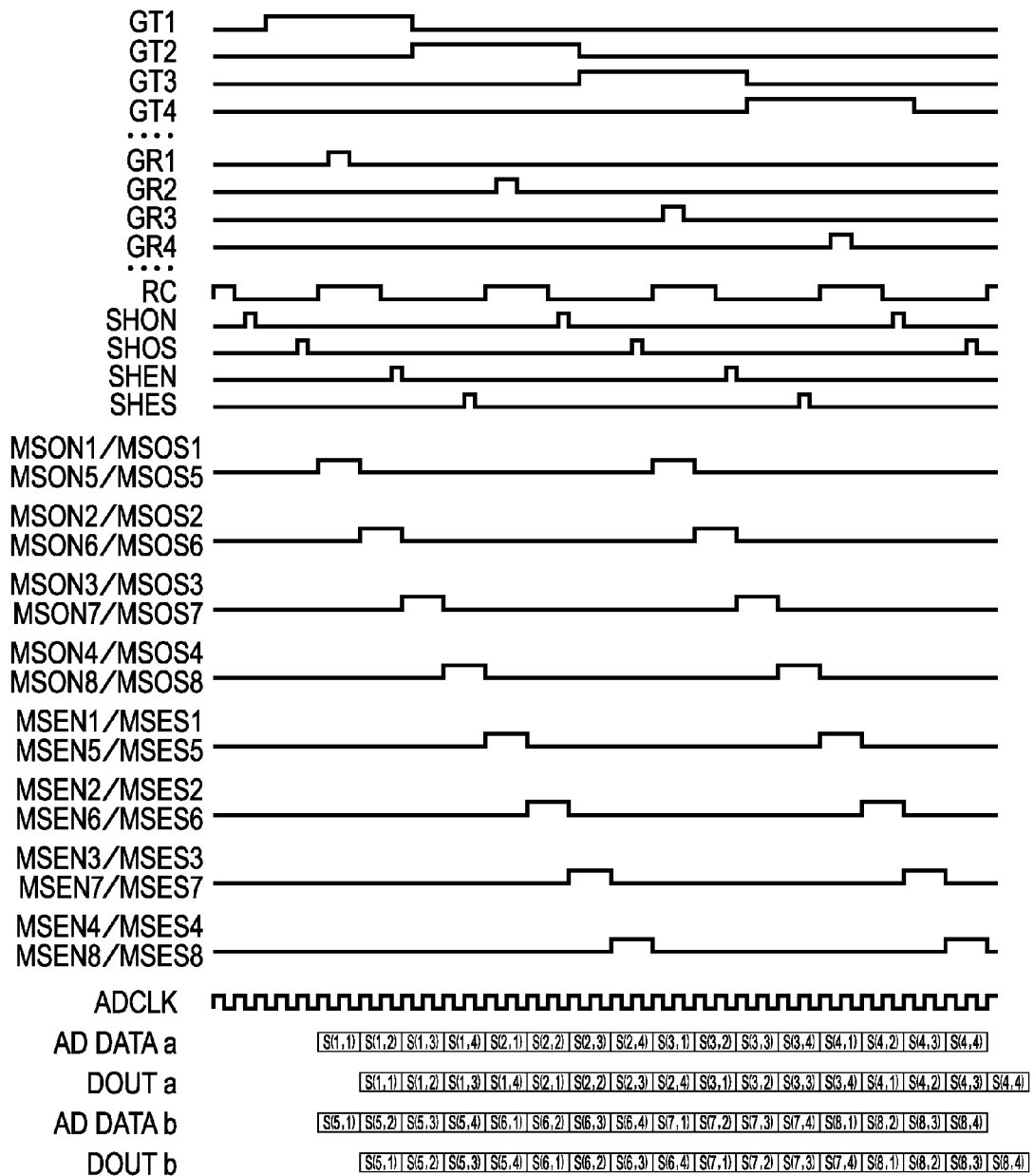
FIG. 4 is a timing chart of the imaging apparatus according to the embodiment of the present invention.

An example of the operation of the imaging apparatus according to the embodiment of the present invention will now be described with reference to FIG. 2 and FIG. 4. FIG. 4 is a timing chart illustrating the image capturing operation of the imaging apparatus according to the present embodiment. The imaging apparatus 100 performs an output operation of the pixels in units of rows in the present embodiment.

Upon irradiation of the conversion unit 101 with radiation or light, the electric charge corresponding to the radiation or light with which the conversion unit 101 is irradiated is generated in each conversion element S. First, the imaging apparatus 100 starts a reset operation described below. The integration capacitor Cf is reset by the reset switch RC to which the control signal 116 is applied from the control unit 108 to reset the amplifier circuit, which is the transmission path. The reset switch RC becomes in the non-conductive state to terminate the reset operation. The reset operation is an operation in which the conductive state of the reset switch is kept and which returns the voltage of the transmission path to a predetermined initialization value.

Next, the imaging apparatus 100 starts a noise-component sample-and-hold operation described below. The control signal 120$n$ and a control signal 120$oe$ are supplied from the control unit 108 to the sample-and-hold circuit parts. The supply of the control signals 120$n$ and 120$oe$ sets the sampling switch SHON in the odd-row-noise sample-and-hold circuit to the conductive state, and the noise component in the reset amplifier circuit is transferred from the amplifier circuit to the sampling capacitor Chon. The sampling switch SHON is set to the non-conductive state and the noise component is held in the sampling capacitor Chon. The sampling switch SHON is set to the non-conductive state to terminate the noise-component sample-and-hold operation. The noise-component sample-and-hold operation is an operation to keep the conductive state of the sampling switch in each of the noise sample-and-hold circuits.

After the reset operation, the imaging apparatus 100 starts a first-row output operation described below. The start of the first-row output operation is defined by the rising of the drive signal supplied from the output drive circuit 102$a$ to the drive line $GT_1$ in the first row and the output switch elements $T_{11}$ to $T_{18}$ in the first row are set to the conductive state. As a result, the analog electrical signals (pixel signals) based on the electric charge occurring in the conversion elements $S_{11}$ to $S_{14}$ in the first row are supplied in parallel from the pixels to the first readout circuit 103$a$ through the signal lines $Sig_1$ to $Sig_4$. In addition, the analog electrical signals (pixel signals) based on the electric charge occurring in the conversion elements $S_{15}$ to $S_{18}$ in the first row are supplied in parallel from the pixels to the second readout circuit 103$b$ through the signal lines $Sig_5$ to $Sig_8$. The output operation is an operation to keep the conductive state of the output switch element T in the embodiments of the present invention.

Next, the imaging apparatus 100 starts a signal sample-and-hold operation described below. Upon supply of the control signals 120$s$ and 120$oe$ from the control unit 108 to the sample-and-hold circuit parts, the sampling switch SHOS in the odd-row-signal sample-and-hold circuit is set to the conductive state. As a result, the pixel signals read out from the pixels in the first row are transferred to the sampling capacitor Chos through the amplifier circuit. Here, the noise components of the amplifier circuit are added to the pixel signals. The sampling switch SHOS is set to the non-conductive state and the pixel signals to which the noise components are added are held in the sampling capacitor Chos. During the signal sample-and-hold operation, the conductive state of the output switch elements $T_{11}$ to $T_{18}$ in the first row is kept to continue the output operation. When the sampling switch SHOS is set to the non-conductive state, the signal sample-and-hold operation is terminated. The signal operation is an operation to keep the conductive state of the sampling switches in the signal sample-and-hold circuits.

Next, the imaging apparatus 100 starts a signal processing operation described below. The control signal 117$a$ is supplied from the control unit 108 to the reset switches SRS and SRN. As a result, the reset switches SRS and SRN are set to the conductive state and the reference voltage $Vref_2$ is supplied to the gate of each of the buffers SFS and SFN to reset the inputs of the buffers SFS and SFN. Then, the reset switches SRS and SRN are set to the non-conductive state and the control signal 117b is supplied from the control unit 108 to each multiplexer. In response to the supply of the control signal 117b, the switch MSOS1 and the switch MSON1 in the first multiplexer 204a are set to the conductive state. As a result, the pixel signals from the pixels in the first column, to which the noise components are added, are supplied to the first differential amplifier 205a through the signal buffer SFS and the noise components are supplied to the first differential amplifier 205a through the noise buffer SFN. In addition, the switch MSOS5 and the switch MSON5 in the second multiplexer 204b are simultaneously set to the conductive state. As a result, the pixel signals from the pixels in the fifth column, to which the noise components are added, are supplied to the second differential amplifier 205b through the signal buffer SFS and the noise components are supplied to the second differential amplifier 205b through the noise buffer SFN. The pixel signals to which the noise components are added and the noise components are subjected to differential processing in each differential amplifier. The pixel signals subjected to the differential processing are amplified and are output from the differential amplifier. This eliminates the noise components in each amplifier circuit from the output from the amplifier circuit. The first A/D converter 104a and the second A/D converter 104b convert each pixel signal that is output into digital data S(1,1) and digital data S(1,5), respectively, and supply the digital data to the digital data processor 105. Then, the inputs of the signal buffer SFS and the noise buffer SFN are reset again, the output operation of the pixel data is then performed to the pixels in the second column and the sixth column, and digital data S(1,2) and digital data S(1,6) are supplied from the first A/D converter 104a and the second A/D converter 104b, respectively, to the digital data processor 105. Similarly, the reset operation, the output operation of the pixel data from the pixels in the third column and the seventh column, the reset operation, and the output operation of the pixel data from the pixels in the fourth column and the eighth column are sequentially performed. As a result, digital data S(1,3) and digital data S(1,7) and digital data S(1,4) and digital data (1,8) are respectively supplied to the digital data processor 105. Then, the signal processing operation is terminated. This signal processing operation is performed between the start of the reset operation performed during the output operation of a certain row and the start of the reset operation performed during the output operation of a row subsequent to the certain row. In other words, the signal processing operation for the pixels in a certain row is performed temporally in parallel with the output operation of the pixels operated subsequently to the certain row.

Next, a first-row initialization operation will now be described. The initialization operation is performed in the conversion unit 101 in parallel with the signal processing operation in the readout circuit portion 103. The output switch elements $T_{11}$ to $T_{18}$ kept the conductive state also after the pixel signals are output. The control signal 116 is supplied from the control unit 108 in this state to start the reset operation, and the signal lines $Sig_1$ to $Sig_8$ and the first electrodes of the conversion elements $S_{11}$ to $S_{18}$ in the first row are set to "$Vref_1$" by the reset switch RC. The initialization switch elements $R_{11}$ to $R_{18}$ are set to the conductive state in this state to start the initialization operation. As a result, the voltage of the first electrode of each of the conversion elements $S_{11}$ to $S_{18}$ is increased for the initialization operation. Here, the voltage of the second electrode of each of the conversion elements $S_{11}$ to $S_{18}$ is determined by Equation (1):

$$Vsens = \frac{TRon}{RRon + TRon} \times (Vref - Vref_1) + Vref_1 \quad (1)$$

where "TRon" denotes the on-resistance of each of the output switch elements $T_{11}$ to $T_{18}$ and "RRon" denotes the on-resistance of each of the initialization switch elements $R_{11}$ to $R_{18}$. Then, the initialization switch elements $R_{11}$ to $R_{18}$ are set to the non-conductive state to terminate the initialization operation. The voltage of the second electrode of each of the conversion elements $S_{11}$ to $S_{18}$ is returned to "$Vref_1$" and the imaging apparatus 100 is ready for the photoelectric conversion. Also after the termination of the initialization operation, the conductive state of the reset switches RC in the readout circuit portion 103 is kept to reset the integration capacitor Cf and the signal lines $Sig_1$ to $Sig_8$.

Next, the control signal 116 is supplied from the control unit 108 to the amplifier circuit parts 202 to set the reset switches RC to the non-conductive state and the reset operation is terminated. Also during the initialization operation and the reset operation, the conductive state of the output switch elements $T_{11}$ to $T_{18}$ in the first row is kept to continue the output operation.

Next, the imaging apparatus 100 starts the noise-component sample-and-hold operation again. The control signals 120n and 120oe are supplied from the control unit 108 to the sample-and-hold circuit parts. As a result, the sampling switches SHEN in the even-row-noise sample-and-hold circuit are set in the conductive state and the noise components in the reset amplifier circuit are transferred from the amplifier circuit to the sampling capacitor Chen. The sampling switch SHEN is set to the non-conductive state to terminate the noise-component sample-and-hold operation and the noise components are held in the sampling capacitor Chen. Also during the noise-component sample-and-hold operation, the conductive state of the output switch elements $T_{11}$ to $T_{18}$ in the first row is kept to continue the output operation.

After the termination of the noise-component sample-and-hold operation, the on-pulse applied from the output drive circuit 102a to the drive line $GT_1$ in the first row rises to apply the voltage for the non-conductive state, thereby setting the output switch elements $T_{11}$ to $T_{18}$ in the first row to the non-conductive state. Then, the first-row output operation is terminated.

Next, the imaging apparatus 100 performs a second-row output operation described below. After the termination of the first-row output operation, the on-pulse is applied from the output drive circuit 102a to the drive line $GT_2$ in the second row to set the output switch elements $T_{21}$ to $T_{28}$ in the second row to the conductive state. As a result, the second-row output operation is started and the pixel signals based on the electric charge occurring in the conversion elements $S_{21}$ to $S_{24}$ in the second row are transmitted from the pixels in parallel to the first readout circuit 103a through the signal lines $Sig_1$ to $Sig_4$. In addition, the pixel signals based on the electric charge occurring in the conversion elements $S_{25}$ to $S_{28}$ in the second row are transmitted from the pixels in parallel to the second readout circuit 103b through the signal lines $Sig_5$ to $Sig_8$. Then, the control signals 120s and 120oe are supplied from the control unit 108 to the sample-and-hold circuit parts to perform a second-row sample-and-hold operation. As a result, the sampling switches SHES in the even-row-signal sample-and-hold circuit are set to the conductive state and the pixel signals that are read out are transferred to the sampling capacitor Ches through the amplifier circuit. Here, the noise components in the amplifier circuit are added to the pixel signals. Then, the sampling switches SHES are set to non-conductive state and the pixel signals to which the noise components are added are held in the sampling capacitor Ches.

The signal processing operation, the initialization operation, the reset operation, and the termination of the output operation of the second row are performed, as in the first row. Similarly, also in the third to eighth rows, the start of the output operation, the sample-and-hold operation, the initialization operation, the reset operation, and the termination of the output operation are repeated in units of rows to output the pixel signals corresponding to all the pixels in the conversion unit 101.

The present embodiment is summarized as follows: after the termination of the reset operation, the output operation of a certain row is terminated and the output operation of another row subsequent to the certain row is started. Alternatively, the noise-component sample-and-hold operation is started after the termination of the reset operation, and the output operation of a certain row is terminated and the output operation of another row subsequent to the certain row is started after the termination of the noise-component sample-and-hold operation. Then, the signal sample-and-hold operation is started after the termination of the output operation of the certain row and the start of the output operation of the other row, the reset operation and the initialization operation are started after the termination of the signal sample-and-hold operation, and the reset operation is terminated after the termination of the initialization operation. The control unit 108 controls the output drive circuit 102a, the initialization drive circuit 102b, and the readout circuit portion 103 so that the above operations are performed. Specifically, after the termination of the conduction of the reset switch RC, the conduction of the output switch elements $T_{11}$ to $T_{18}$ in a certain row is terminated and the conduction of the output switch elements $T_{21}$ to $T_{28}$ in another row is started. Alternatively, the conduction of the noise sampling switches SHN is started after the termination of the conduction of the reset switch RC, and the conduction of the output switch elements $T_{11}$ to $T_{18}$ is terminated and the conduction of the output switch elements $T_{21}$ to $T_{28}$ is started after the termination of the conduction of the noise sampling switches SHN. Then, the conduction of the signal sampling switches SHS is started after the termination of the conduction of the output switch elements $T_{11}$ to $T_{18}$ and the start of the conduction of the output switch elements $T_{21}$ to $T_{28}$. The conduction of the reset switch RC and the conduction of the initialization switch elements $R_{21}$ to $R_{28}$ are started after the termination of the conduction of the signal sampling switches SHS, and the conduction of the reset switch RC is terminated after the termination of the conduction of the initialization switch elements $R_{22}$ to $R_{28}$. The termination of the output operation of a certain row can be performed simultaneously with the start of the output operation of another row subsequent to the certain row.

An electrical signal that is read out according to an embodiment of the present invention will now be described, taking an electrical signal read out from a pixel in the second row as an example.

First, the reset operation is performed to reset the signal lines $Sig_1$ to $Sig_8$, which is the transmission path, and the integration capacitor Cf. Then, the output operation of the first row is terminated. An output voltage V1n from the operational amplifier A at the termination of the output operation of the first row is expressed by Equation (2):

$$V1n = V_{REF}1 + (Qgs1n/Cf1) \tag{2}$$

where "Cf1" denotes the capacitance of the integration capacitor, "$V_{REF}1$" denotes the voltage of the reference voltage $Vref_1$ supplied to the operational amplifier A, and "Qgs1n" denotes the electric charge entering through the parasitic capacitance occurring in the first row.

Next, the electrical signal based on an electric charge Q2n converted in each pixel in the second row is read out in the output operation and is output from the operational amplifier A to prepare for the sample-and-hold operation. The output voltage V1n from the operational amplifier A before the sample-and-hold operation of the second row is expressed by Equation (3):

$$V1n = V_{REF}1 + (Qgs1n/Cf1) - (Q2n/Cf1) - (Qgs2n/Cf1) \tag{3}$$

where "Qgs2n" denotes the electric charge entering through the parasitic capacitance occurring in the second row.

The electric charge Qgs1n entering at the termination of the output operation of the first row is expressed by Equation (4):

$$Qgs1n = (Vgon - Vgoff)/Cgs1n \tag{4}$$

where "Vgon" denotes the voltage of the drive signal in a Hi state, "Vgoff" denotes the voltage of the drive signal in a Lo state, and "Cgs1n" denotes the parasitic capacitance occurring in the first row.

The electric charge Qgs2n entering at the start of the output operation of the second row is expressed by Equation (5):

$$Qgs2n = (Vgon - Vgoff)/Cgs2n \tag{5}$$

where "Cgs2n" denotes the parasitic capacitance occurring in the second row.

Since the parasitic capacitance Cgs1n occurring in the first row is close to the parasitic capacitance Cgs2n occurring in the second row in the conversion unit 101, the conversion unit 101 is prepared so that the parasitic capacitance Cgs1 has a value approximately the same as that of the parasitic capacitance Cgs2n. Accordingly, Equation (6) is expressed:

$$Cgs1n = Cgs2n, Qgs1n = Qgs2n \tag{6}$$

According to Equations (4) to (6), the output voltage Vin from the operational amplifier A before the sample-and-hold operation of the second row expressed by Equation (3) is expressed by Equation (7):

$$V1n = V_{REF}1 - (Q2n/Cf1) \tag{7}$$

As described above, according to the present embodiment, the output operation of a certain row is terminated and the output operation of another row is started after the reset operation, and the sample-and-hold operation is performed after the start of the output operation. Accordingly, the voltage variation components caused by the rising and falling of the drive signal are offset and the electrical signal that is output and held is not affected by the voltage variation components. According to the present embodiment, it is possible to perform the sample-and-hold operation and the reset operation before the output operation is terminated after the output operation has been started. Accordingly, it is not necessary to wait a certain time for the voltage variation component of the signal line which converges into a certain voltage after the output operation is terminated before the sample-and-hold operation is performed, unlike U.S. Patent Application Publication No. 2010/0046711. Consequently, according to the present embodiment, it is possible to reduce the frame time without decreasing the S/N ratio of the image signal.

In addition, according to the present embodiment, the output switch element T keeps the conductive state also during the initialization operation after the start of the output operation. As described above, the output switch element T has the parasitic capacitance and the conversion element S functions as a capacitance element Cs. Accordingly, the drive line $GT_1$ is capacitively coupled to the sensor bias line VS because the parasitic capacitance of the output switch element T is connected in series to the capacitance Cs of the conversion element S. Consequently, upon application of the on-pulse to the drive line $GT_1$ in order to control the conductive state and the non-conductive state of the output switch element T, an electric current in proportion to the coupling capacitance flows through the sensor bias line VS that is capacitively coupled to the drive line $GT_1$. Since the sensor bias line VS is commonly used in the entire conversion unit 101, the sensor bias line VS has a high capacitance Cvs. For example, when a capacitance of 0.1 pF is coupled to the sensor bias line VS per pixel and the conversion unit includes pixels of 3,000 by 3,000=9,000,000, the capacitance Cvs of the entire sensor bias line VS is equal to 0.9 µF. In addition, the sensor bias line VS is led into the conversion unit from an external printed circuit board, such as a flexible circuit board. The total resistance of the sensor bias line VS including the wiring resistance and the connection resistance of the flexible circuit board and the routing resistance in the conversion unit is denoted by an input resistance Rin. The input resistance Rin has a value of a few ohms even if multiple flexible circuit boards are used to lead the input resistance Rin into the conversion unit in parallel. For example, when the input resistance Rin is equal to 5Ω, the sensor bias line VS has a time constant τ=5Ω by 0.9 µF=4.5 µs due to the capacitance Cvs of the sensor bias line VS and the input resistance Rin. Accordingly, when the on-pulse is applied to the drive line $GT_1$, the voltage of the sensor bias line VS is varied due to the coupling capacitance and it takes a time to stabilize the sensor bias line VS. For example, when it takes a time 5τ to stabilize the sensor bias line VS, it actually takes a time of 5 by 4.5 µs=22.5 µs. Since the sensor bias line VS is also capacitively coupled to the signal lines $Sig_1$ to $Sig_8$, the readout of a signal while the voltage of the sensor bias line VS is being varied causes the signal lines $Sig_1$ to $Sig_8$ to be affected by the variation components to decrease the S/N ratio. Consequently, it is possible to achieve a high-sped operation by keeping the output switch element T in the conductive state also during the initialization operation.

For example, when the imaging apparatus is applied to a radiation imaging apparatus and an image of a human body is captured by the radiation imaging apparatus, the image includes areas in which the radiation is transmitted through the human body to be incident in the conversion unit 101 and areas in which the radiation is incident in the conversion unit 101 without being transmitted through the human body. Since absorption of the radiation into the human body does not occur when the radiation is incident in the conversion unit 101 without being transmitted through the human body, the conversion unit 101 is irradiated with high-level radiation. In such a case, the electric charge of, for example, 1 pC to 10 pC is accumulated in the conversion element S. In the readout of such high-level electric charge, an electric current in proportion to the accumulated electric charge flows through the sensor bias line VS at the moment when the output switch element T is set to the conductive state. Accordingly, as in the drive line described above, the electric current flows through the sensor bias line VS to vary the voltage of the sensor bias line VS and it takes a time depending on Cvs by Rin for the voltage of the sensor bias line VS to be stabilized. The sensor bias line VS is often used as a common line in the conversion unit 101, and the voltage of the sensor bias line VS in the entire conversion unit 101 is varied even when the current flows through part of the sensor bias line VS. Furthermore, the sensor bias line VS is also capacitively coupled to the signal lines $Sig_1$ to $Sig_8$. Accordingly, the readout of the signal while the voltage of the sensor bias line VS is being varied causes the signal lines $Sig_1$ to $Sig_8$ to be affected by the variation components and the variation in the voltage of the sensor bias line VS appears in the image. Consequently, if part of the conversion unit 101 is irradiated with high-level radiation, the variation components of the sensor bias line VS may possibly appear also in the areas that are not irradiated with the radiation in the image through the common sensor bias line VS as crosstalk.

In order to suppress such crosstalk, it is necessary to wait a sufficient time before the signal is sampled and held after the conductive state of the output switch element T has been started and to wait for the stabilization of the variation in the voltage of the sensor bias line VS. It is desirable that Tsh>5 by Cvs by Rin where the "Tsh" denotes the time before the sample-and-hold operation is terminated after the output operation has been started.

Furthermore, the capacitance Cvs of the sensor bias line VS and the input resistance Rin can be decreased and the response time of the variation components of the sensor bias line VS can be shortened to support quick readout, as in recording of movies.

The wiring resistance of the flexible circuit board and the connection resistance between the flexible circuit board and the conversion unit can be reduced by leading the input resistance Rin into the conversion unit through, for example, multiple flexible lines. The wiring resistance of the sensor bias line in the conversion unit can be reduced by, for example, increasing the width of the line and/or the film thickness.

The capacitance Cvs of the sensor bias line VS includes a capacitance that is directly coupled to the drive line GT, the drive line GR, and the signal line Sig and a capacitance that is coupled to the drive line GT, the drive line GR, and the signal line Sig via the capacitance of the conversion element S. Accordingly, it is necessary to reduce such capacitances in the layout of the pixels.

Figure 5:
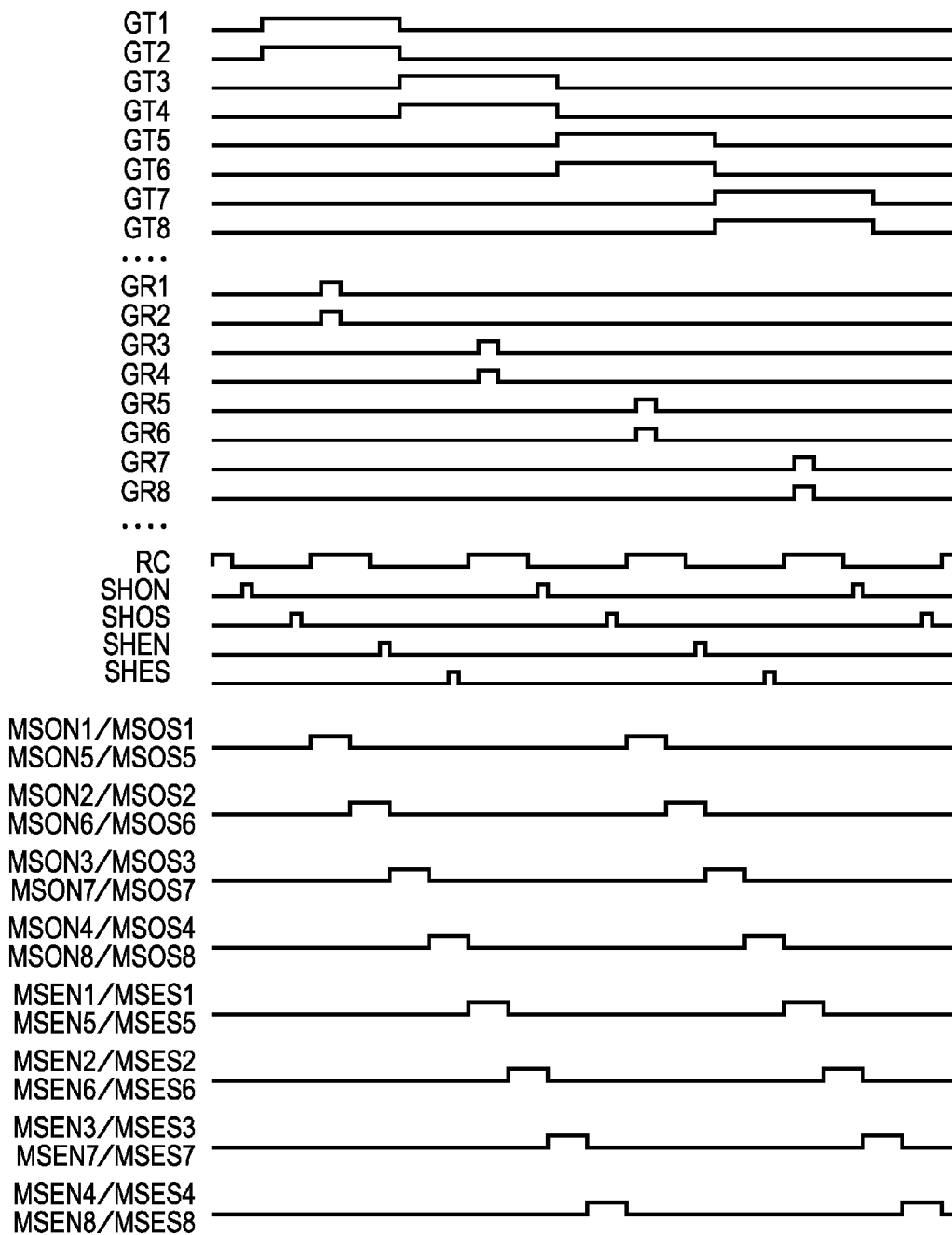
FIG. 5 is another timing chart of the imaging apparatus according to the embodiment of the present invention.

Although the readout operation and the initialization operation in the conversion unit 101 including multiple pixels of eight rows by eight columns are described in the above embodiments, the present invention is not limited to the above conversion unit 101 and can be applied to a conversion unit including pixels of a number that is larger than eight rows by eight columns. Although the example in which the operations are sequentially performed in the order from the first to third rows is described in the above embodiments, the present invention is not limited to the above operation mode. The order of the operations may be appropriately defined as long as the operations are performed to different rows at different timings. Although the example in which the operations are sequentially performed for every row is described in the above embodiments, the present invention is not limited to the above operation mode. A mode in which the operations are sequentially performed in unit of multiple rows may be adopted. For example, a mode in which each operation is performed for two columns and the operations are sequentially performed in unit of two rows may be adopted. FIG. 5 is a timing chart illustrating such a mode in the radiation imaging apparatus according to the embodiment of the present invention. Referring to FIG. 5, each operation is performed for two rows, among multiple pixels of eight rows by eight columns, and the operations are sequentially performed in unit of two rows. Performing the operations in unit of multiple rows allows an image signal having an excellent S/N ratio to be acquired while achieving a shorter frame time.

Figure 6:
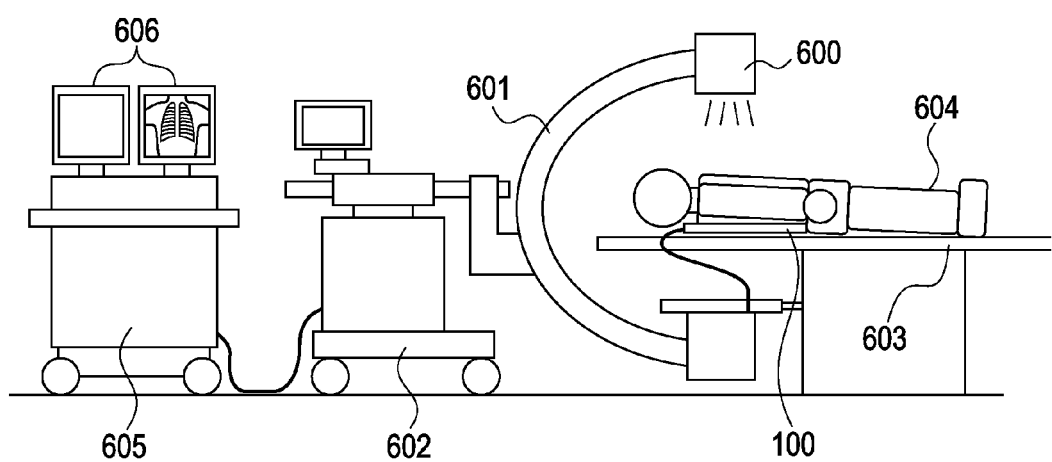
FIG. 6 is an exemplary conceptual diagram of an imaging system using the imaging apparatus according to an embodiment of the present invention.

FIG. 6 illustrates a movable radiation imaging system using the imaging apparatus according to an embodiment of the present invention.

FIG. 6 is an exemplary conceptual diagram of an imaging system using a movable imaging apparatus capable of capturing still images and recording movies. Referring to FIG. 6, the imaging system includes a radiation generating apparatus 600, a C-shaped arm 601 that functions as a holder capable of holding the imaging apparatus 100, and a dolly 602 that makes the radiation generating apparatus 600, the imaging apparatus 100, and the C-shaped arm 601 movable. The imaging system also includes a bed 603 on which a subject 604 is loaded, a movable control apparatus 605 that is configured so as to be capable of controlling the above components, and a display apparatus 606 capable of displaying an image captured by the imaging apparatus 100. The control apparatus 605 includes, for example, a control computer, a console, and a radiation control apparatus and is capable of performing image processing to an image signal acquired by the imaging apparatus 100 and transmitting the image signal subjected to the image processing to the display apparatus 606 or the like. Image data generated in the image processing in the control apparatus 605 can be transferred to a remote site through a transmission unit, such as a phone line. This allows a doctor in the remote site to perform image diagnosis based on the transferred image data. The transferred image data can be recorded on a film or stored in a storage device, such as an optical disk.

However, the imaging apparatus 100 may be removable from the C-shaped arm 601 and a radiation generating apparatus different from the radiation generating apparatus 600 mounted to the C-shaped arm 601 may be used to perform the image capturing.

The application of the imaging apparatus according to the embodiment of the present invention to the radiation imaging system in the above manner allows an image signal having a excellent S/N ratio to be acquired while achieving a desired frame time.

The processing steps in the control unit 108 may be realized by a computer in the control unit 108, which executes programs. In this case, a lookup table LUT and the programs are stored in the control unit 108. In addition, the present invention can be embodied by a unit to supply the programs to the computer, for example, a computer-readable recording medium, such as a compact disc-read only memory (CD-ROM), having the programs recorded thereon or a transmission medium, such as the Internet, over which the programs are transmitted. The computer program product, such as the computer-readable recording medium, having the programs recorded thereon is also applied as an embodiment of the present invention. The programs, the recording medium, the transmission medium, and the computer program product described above are included in the scope of the present invention. For example, a flexible disk, a hard disk, an optical disk, a magneto-optical disk, a CD-ROM, a magnetic tape, a non-volatile memory card, or a ROM may be used as the recording medium.

While the present invention has been described with reference to exemplary embodiments, it is to be understood that the invention is not limited to the disclosed exemplary embodiments. For example, embodiments of the present invention have been described as being related to radiation imaging. Here, the radiation includes not only alpha rays, beta rays, and gamma rays, which are beams made of particles (including photons) emitted due to radiation damage, but also beams, such as X rays, particle beams, and cosmic rays, having the energies of at least the same level as those of the alpha rays, the beta rays, and the gamma rays. Accordingly, the scope of the following claims is to be accorded the broadest interpretation so as to encompass all such modifications and equivalent structures and functions.

This application claims the benefit of Japanese Patent Application No. 2009-245806 filed Oct. 26, 2009, which is hereby incorporated by reference herein in its entirety.

What is claimed is:

1. An imaging apparatus comprising:

a conversion unit including a plurality of pixels arranged in a matrix of rows and columns, each pixel including a conversion element that has a semiconductor layer arranged between a first electrode and a second electrode and being adapted to convert radiation or light into an electric charge, an output switch element that has one of two main terminals connected to the first electrode and is adapted to perform an output operation to be in a conductive state to output an electrical signal based on the electric charge of the conversion element, and an initialization switch element that has one of two main terminals connected to the first electrode and is adapted to perform an initialization operation to initialize the conversion element and that is provided separately from the output switch element in a conductive state;

an output drive circuit adapted to control the output operation of the output switch element in units of rows;

an initialization drive circuit adapted to control the initialization operation of the initialization switch element in units of rows;

a readout circuit including a transmission path through which an electrical signal output from the conversion element is transmitted, the readout circuit being adapted to perform a signal sample-and-hold operation to temporarily hold the electrical signal read out through the transmission path and a reset operation to reset a voltage of the transmission path, wherein the transmission path includes an amplifier circuit part that is adapted to amplify the electrical signal, and the amplifier circuit part includes an amplifier circuit including an operational amplifier that is adapted to amplify the electrical signal and outputs the amplified electrical signal, an integration capacitor, and a reset switch that resets the integration capacitor; and a control unit adapted to control the output drive circuit, the initialization drive circuit, and the readout circuit, wherein the control unit, by controlling the output drive circuit, the initialization drive circuit and the readout circuit, implements a first control in which both termination of the output operation of a certain row and start of the output operation of another row subsequent to the certain row are performed after termination of the reset operation, a second control in which start of the signal sample-and-hold operation is performed after the first control, a third control in which start of the reset operation and start of the initialization operation of the another row are performed after the termination of the signal sample-and-hold operation, a fourth control in which termination of the reset operation is performed after the termination of the initialization operation of the another row, and a fifth control in which both termination of the output operation of the another row and start of the output operation of a different row subsequent to the another row are performed after the fourth control.

2. The imaging apparatus according to claim 1,
wherein the readout circuit is further adapted to perform a noise-component sample-and-hold operation to temporarily hold a noise component of the transmission path, and
wherein the control unit is adapted to control the output drive circuit, the initialization drive circuit, and the readout circuit so as to perform the first control in which start of the noise-component sample-and-hold operation is performed after the termination of the reset operation and the termination of the output operation of the certain row and the start of the output operation of the another row are performed after the termination of the noise-component sample-and-hold operation, the second control in which the start of the signal sample-and-hold operation is performed after the first control, the third control in which the start of the reset operation and the initialization operation of the another row are performed after the termination of the signal sample-and-hold operation, the fourth control in which the termination of the reset operation is performed after the termination of the initialization operation of the another row, and the fifth control in which start of the noise-component sample-and-hold operation is performed after the fourth control, and both the termination of the output operation of the another row and the start of the output operation of the different row subsequent to the another row are performed after the fourth control.

3. The imaging apparatus according to claim 1,
wherein the control unit is adapted to control the output drive circuit, the initialization drive circuit, and the readout circuit so as to perform the output operation of the output switch elements for multiple rows at a time.

4. The imaging apparatus according to claim 1,
wherein the second electrode is electrically connected to a bias power supply,
wherein the other of the two main terminals of the initialization switch element is electrically connected to an initialization power supply,
wherein the bias power supply is adapted to supply to the first electrode a first voltage to set the conversion element to a state in which a conversion operation can be performed, and
wherein the initialization power supply supplies to the first electrode a second voltage to set the conversion element to a state in which the initialization operation can be performed.

5. The imaging apparatus according to claim 4, further comprising:
a sensor bias line having a capacitance Cvs and a resistance Rin,
wherein the bias power supply is electrically connected to the second electrodes of a plurality of conversion elements via the sensor bias line, and
wherein Tsh>5×Cvs×Rin, where Tsh denotes an amount of time before the sample-and-hold operation is terminated after the output operation has been started.

6. A radiation imaging system comprising:
the imaging apparatus according to claim 1; and
a control apparatus controlling at least the imaging apparatus.

7. A method of controlling an imaging apparatus including a conversion unit that includes a plurality of pixels arranged in a matrix of rows and columns, each pixel including a conversion element that has a semiconductor layer arranged between a first electrode and a second electrode and is adapted to convert radiation or light into an electric charge, an output switch element that has one of two main terminals connected to the first electrode and is adapted to perform an output operation to be in a conductive state to output an electrical signal based on the electric charge of the conversion element, and an initialization switch element that has one of two main terminals connected to the first electrode and is adapted to perform an initialization operation to initialize the conversion element and that is provided separately from the output switch element in a conductive state, and a readout circuit that includes a transmission path through which the output electrical signal is transmitted and that performs a signal sample-and-hold operation to temporarily hold the electrical signal read out through the transmission path and a reset operation to reset the voltage of the transmission path, wherein the transmission path includes an amplifier circuit part that is adapted to amplify the electrical signal, and the amplifier circuit part includes an amplifier circuit including an operational amplifier that is adapted to amplify the electrical signal and outputs the amplified electrical signal, an integration capacitor, and a reset switch that resets the integration capacitor, the method comprising the steps of:
performing a first control including both terminating the output operation of a certain row and starting the output operation of another row subsequent to the certain row after termination of the reset operation;
performing a second control including starting the signal sample-and-hold operation after the first control;
performing a third control including starting the reset operation and starting the initialization operation of the another row after the termination of the signal sample-and-hold operation;
performing a fourth control including terminating the reset operation after the termination of the initialization operation of the another row; and
performing a fifth control including both terminating the output operation of the another row and starting the output operation of a different row subsequent to the another row after the fourth control.

8. An imaging apparatus comprising:
a conversion unit including a plurality of pixels arranged in a matrix of rows and columns, each pixel including a conversion element that includes a semiconductor layer arranged between a first electrode and a second electrode and that converts radiation or light into an electric charge, an output switch element that is electrically connected to the first electrode, and an initialization switch element that is electrically connected to the first electrode and to the output switch element;
an output drive circuit electrically connected to control terminals of multiple output switch elements in each row of the matrix;
an initialization drive circuit electrically connected to control terminals of multiple initialization switch elements in each row of the matrix;
a readout circuit including a transmission path through which an electrical signal from the conversion element is transmitted, a signal sampling switch electrically connected to the transmission path, and a first reset switch that resets a voltage of the transmission path, wherein the transmission path includes an amplifier circuit part that is adapted to amplify the electrical signal, and the amplifier circuit part includes an amplifier circuit including an operational amplifier that is adapted to amplify the electrical signal and outputs the amplified electrical signal, an integration capacitor, and the reset switch, wherein the reset switch resets the integration capacitor; and a control unit adapted to control the output drive circuit, the initialization drive circuit, and the readout circuit, wherein the control unit, by controlling the output drive circuit, the initialization drive circuit and the readout circuit, implements a first control including both of conduction of the output switch elements of a certain row and start of the conduction of the output switch elements of another row subsequent to the certain row after termination of conduction of the reset switch, a second control including start of conduction of the signal sampling switch after the first control, a third control including start of the conduction of the reset switch and start of conduction of the initialization switch elements of the another row after the termination of the conduction of the signal sampling switch, a fourth control including termination of the conduction of the reset switch after the termination of the conduction of the initialization switch elements, and a fifth control including both termination the conduction of the output switch elements of the another row and start the conduction of the output switch elements of a different row subsequent to the another row after the fourth control.

* * * * *